(12) United States Patent
Hillis et al.

(10) Patent No.: US 6,967,780 B2
(45) Date of Patent: Nov. 22, 2005

(54) IMAGE CORRECTION USING INDIVIDUAL MANIPULATION OF MICROLENSES IN A MICROLENS ARRAY

(75) Inventors: W. Daniel Hillis, Encino, CA (US); Nathan P. Myhrvold, West Medina, WA (US); Lowell L. Wood, Jr., Livermore, CA (US)

(73) Assignee: Searete LLC, Bellevue, WA (US)

( * ) Notice: Subject to any disclaimer, the term of this patent is extended or adjusted under 35 U.S.C. 154(b) by 0 days.

(21) Appl. No.: 10/764,431

(22) Filed: Jan. 21, 2004

(65) Prior Publication Data

US 2005/0157395 A1    Jul. 21, 2005

(51) Int. Cl.$^7$ ............................................. G02B 27/10
(52) U.S. Cl. ...................... 359/619; 359/626; 382/280; 348/349
(58) Field of Search ................................ 359/619, 626; 348/335, 340, 345, 349, 207.9, 208.11, 222.1; 382/280, 284, 286, 299, 308; 250/200, 201.2, 250/201.7, 201.8, 201.9

(56) References Cited

U.S. PATENT DOCUMENTS

| 5,451,766 | A | | 9/1995 | VanBerkel |
| 6,088,083 | A | * | 7/2000 | Meier ........................... 355/67 |
| 2002/0114077 | A1 | * | 8/2002 | Javidi ........................... 359/618 |
| 2003/0071969 | A1 | | 4/2003 | Levine et al. |
| 2003/0098352 | A1 | | 5/2003 | Schnee et al. |

OTHER PUBLICATIONS

Ta Yuan, "Integration of Focus and Defocus Analysis with Color Stereo for Three-Dimensional Shape Recovery," Dept. of Electrical and Computer Engineering, SUNY at Stony Brook, Sep. 1999. [*postscript (draft)*]. http://www.ece.sunysb.edu/~cvl/DFD/html.

* cited by examiner

*Primary Examiner*—Hung Xuan Dang
*Assistant Examiner*—Joseph Martinez

(57) ABSTRACT

A system constructs a composite image using focus assessment information of image regions.

43 Claims, 5 Drawing Sheets

US 6,967,780 B2

IMAGE CORRECTION USING INDIVIDUAL MANIPULATION OF MICROLENSES IN A MICROLENS ARRAY

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed applications; the present application also claims the earliest available effective filing date(s) from, and also incorporates by reference in its entirety all subject matter of any and all parent, grandparent, great-grandparent, etc. applications of the following listed applications:

1. United States patent application entitled LENS DEFECT CORRECTION, U.S. application Ser. No. 10/738,626 naming William D. Hillis, Nathan P. Myhrvold, and Lowell L. Wood Jr. as inventors, filed 16 Dec. 2003 by express mail.
2. United States patent application entitled IMAGE CORRECTION USING MICROLENS ARRAY AS A UNIT, naming William D. Hillis, Nathan P. Myhrvold, and Lowell L. Wood Jr. as inventors, filed substantially contemporaneously herewith by express mail.

TECHNICAL FIELD

The present application relates, in general, to imaging.

SUMMARY

In one aspect, a method includes but is not limited to: capturing a primary image with a microlens array at a primary position, the microlens array having at least one microlens deviation that exceeds a first tolerance from a target optical property; determining at least one out-of-focus region of the primary image; capturing another image with at least one microlens of the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method embodiments are described in the claims, drawings, and text forming a part of the present application. In addition to the foregoing, other method aspects are described in the claims, drawings, and text forming a part of the present application.

In one or more various aspects, related systems include but are not limited to machinery and/or circuitry and/or programming for effecting the herein-referenced method aspects; the machinery and/or circuitry and/or programming can be virtually any combination of hardware, software, and/or firmware configured to effect the foregoing-referenced method aspects depending upon the design choices of the system designer.

In one aspect, a system includes but is not limited to: a photo-detector array; a microlens array having at least one microlens deviation that exceeds a first tolerance from a target optical property; a controller configured to position at least one microlens of the microlens array at a primary and another position relative to the photo-detector array and to cause an image capture signal at the primary and the other position; and an image construction unit configured to construct at least one out-of-focus region of a first image captured at the primary position with a more in-focus region of another image captured at the other position. In addition to the foregoing, other system aspects are described in the claims, drawings, and text forming a part of the present application.

In one aspect, a system includes but is not limited to: a microlens array having at least one microlens deviation that exceeds a first tolerance from a target optical property; an electromechanical system configurable to capture a primary image with at least one microlens of the microlens array at a primary position said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electromechanical system configurable to capture another image with the at last one microlens of the microlens array at another position said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electromechanical system configurable to determine at least one out-of-focus region of the primary image said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electromechanical system configurable to determine a focus of at least one region of the other image relative to a focus of the at least one out-of-focus region of the primary image said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; an electromechanical system configurable to determine a focus of at least one region of the other image relative to a focus of the at least one out-of-focus region of the primary image said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device; and an electromechanical system configurable to construct a composite image in response to the at least one region of the other image having a sharper focus relative to the focus of the at least one out-of-focus region of the primary image said electromechanical system including at least one of electrical circuitry operably coupled with a transducer, electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device. In addition to the foregoing, other system aspects are described in the claims, drawings, and text forming a part of the present application.

In one aspect, a method includes but is not limited to: capturing a primary image with a microlens array at a primary position, said capturing effected with a photo-detector array having an imaging surface deviation that exceeds a first tolerance from a target surface position; determining at least one out-of-focus region of the primary image; capturing another image with at least one microlens of the microlens array at another position; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, other method aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE FIGURES

The use of the same symbols in different drawings typically indicates similar or identical items.

DETAILED DESCRIPTION

Figure 1:
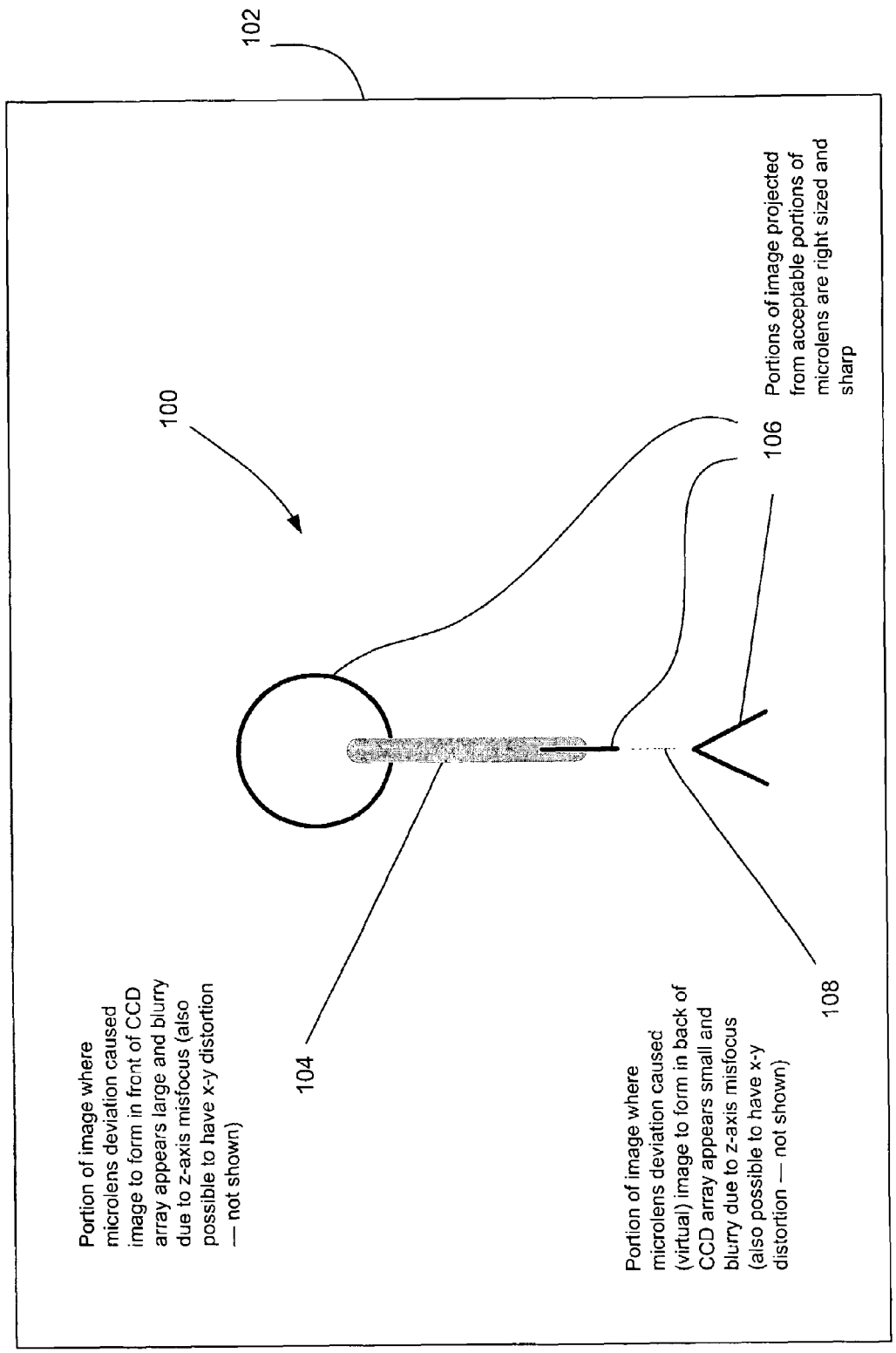
FIG. 1 shows a front-plan view of image 100 of a person (e.g., person 202 of FIG. 2) projected onto photo-detector array 102.

With reference to the figures, and with reference now to FIG. 1, shown is a front-plan view of image 100 of a person (e.g., person 202 of FIG. 2) projected onto photo-detector array 102. Image 100 is shown as distorted due to defects in a microlens array through which image 100 has been projected (e.g., microlens array 204 of lens system 200 of FIG. 2). First portion 104 of image 100 is illustrated as large and blurry, which can occur when a microlens deviation causes first portion 104 of image 100 to come to a focus in front of a surface of photo-detector array 102. Second, third, and fourth portions 106 of image 100 are illustrated as right sized, which can occur when microlenses of the microlens array cause portions 106 to correctly focus on an imaging surface of photo-detector array 102. Fifth portion 108 of image 100 is shown as small and faint, which can occur when a microlens deviation causes fifth portion 108 to come to a focus (virtual) behind an imaging surface of photo-detector array 102. In addition, although not expressly shown, those having skill in the art will appreciate that various microlens defects could also cause the image to be distorted in x-y; those having skill in the art will also appreciate that different colored wavelengths of light can in and of themselves focus at different positions due to differences in refraction of the different colored wavelengths of light. In addition, although not expressly shown herein, those having skill in the art will appreciate that the subject matter disclosed herein may serve to remedy misfocusings/distortions arising from defects other than lens defects, such as, for example, defects in the imaging surface of photo-detector array 102 and/or defects in frames that hold microlens arrays.

Figure 2:
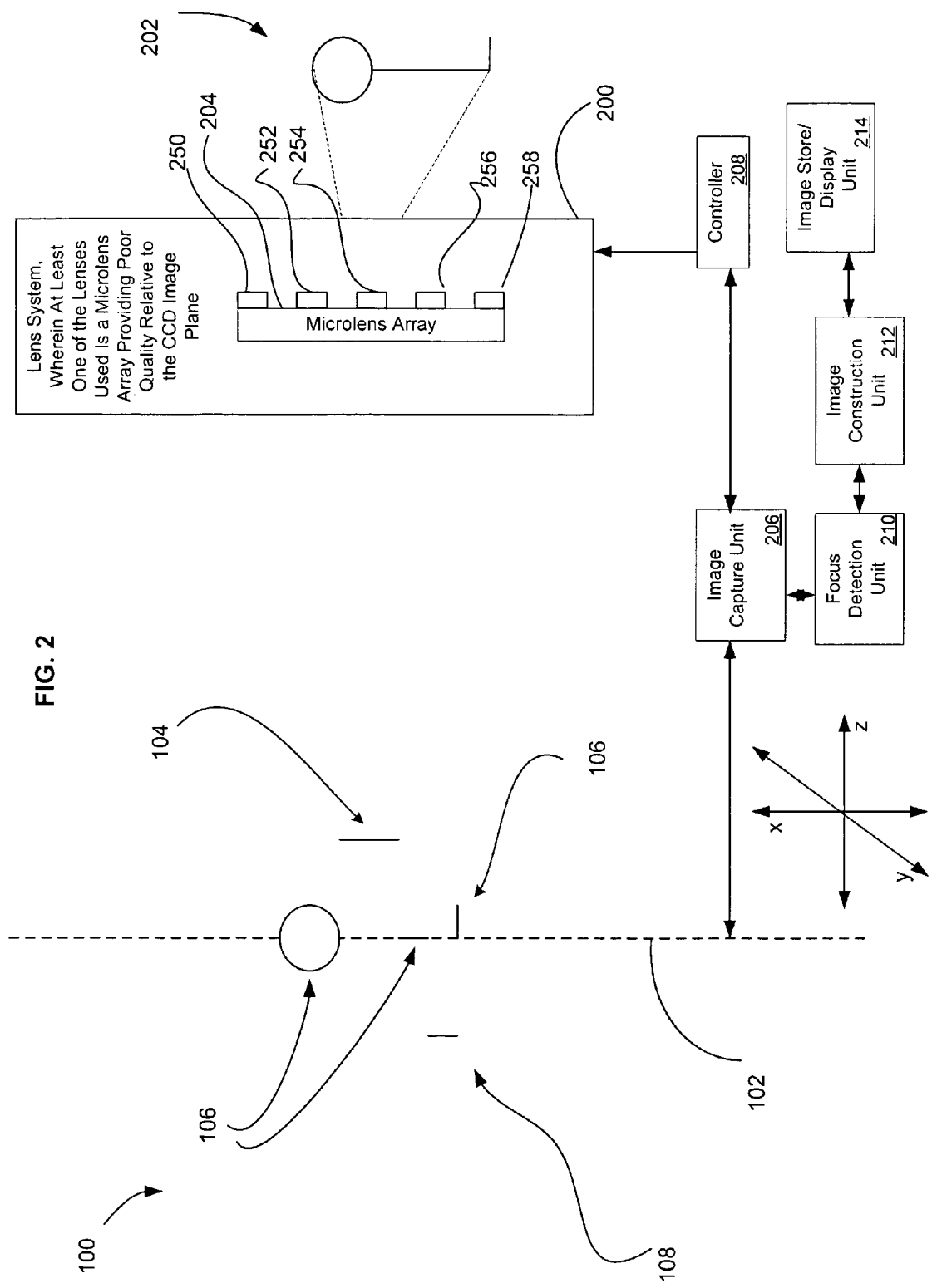
FIG. 2 depicts a side-plan view of lens system 200 that can give rise to image 100 of FIG. 1.

Referring now to FIG. 2, depicted is a side-plan view of lens system 200 that can give rise to image 100 of FIG. 1. Microlens array 204 of lens system 200 is illustrated as located at a primary position and having microlens deviations that give rise to the five different portions of image 100 shown and described in relation to FIG. 1. First portion 104 of image 100 is illustrated as misfocused in front of an imaging surface of photo-detector array 102, where the misfocusing is due to a deviation of microlens 252. Second, third, and fourth portions 106 of image 100 are illustrated as respectively right sized and focused by microlenses 250, 254, and 258 on an imaging surface of photo-detector array 102. (It is recognized that in side plan view the head and feet of person 202 would appear as lines; however, for sake of clarity they are shown in profile in FIG. 2 to help orient the reader relative to FIG. 1.) Fifth portion 108 is shown as small and faint, and (virtually) misfocused behind an imaging surface of photo-detector array 102, where the misfocusing is due to a deviation of microlens 256. In addition, although not expressly shown herein, those having skill in the art will appreciate that the subject matter of FIG. 2 is also illustrative of those situations in which one or more individual photo-detectors forming part of the imaging surface of photo-detector array 102—rather than one or more microlenses of microlens array 204—deviate from one or more predefined positions by amounts such that image misfocuses/distortions arising from such deviations are unacceptable. That is, insofar as image misfocusing or distortion could just as easily arise from photo-detector array 102 having mispositioned photo-detectors as from microlens array 204 having mispositioned/defective lenses, the subject matter disclosed herein may serve to remedy misfocusings/distortions arising from defects in the imaging surface of photo-detector array 102.

Figure 3:
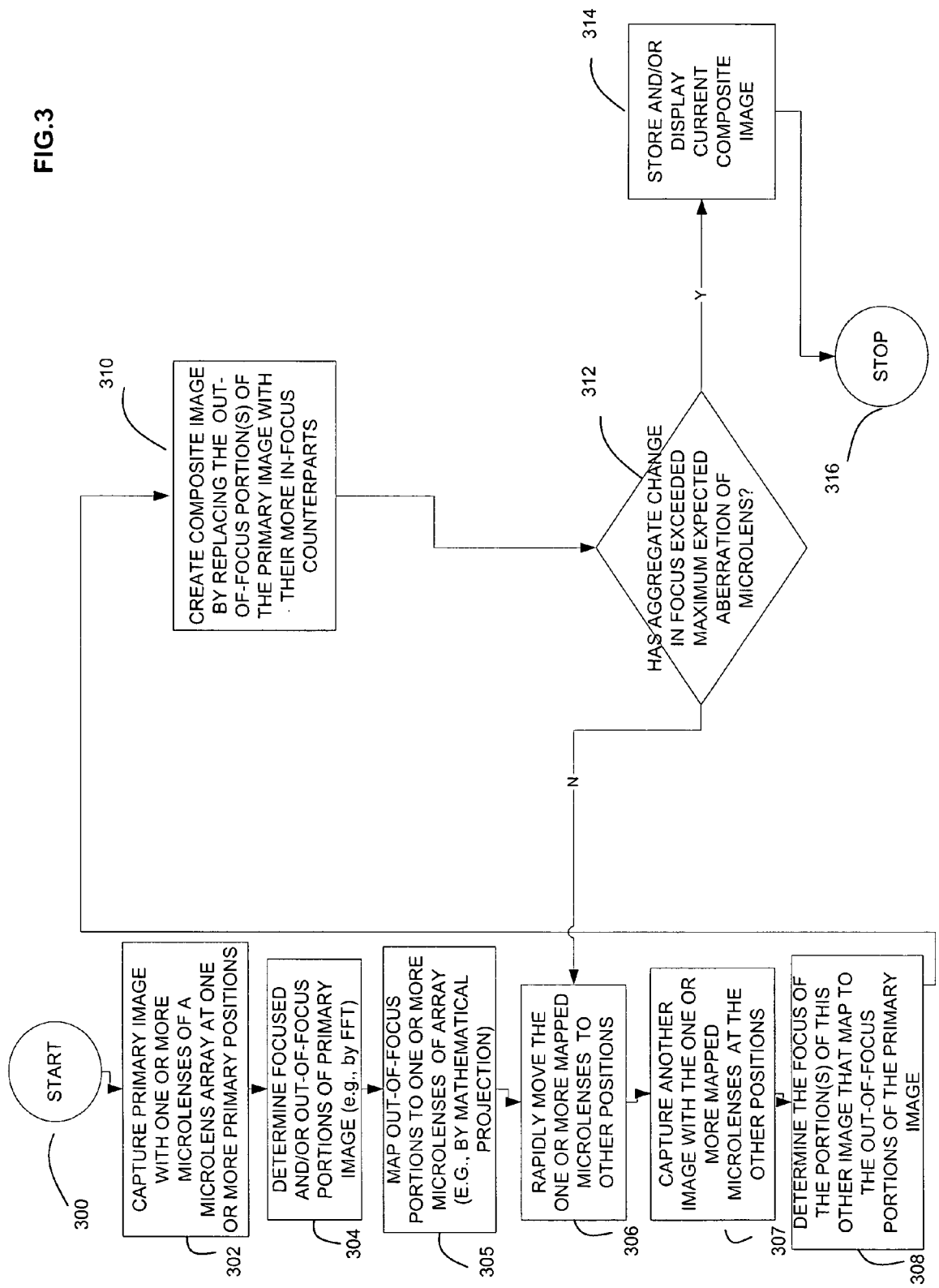
FIG. 3 depicts a high level logic flowchart of a process.

Continuing to refer to FIG. 2, further shown are components that can serve as an environment for the process shown and described in relation to FIG. 3. Specifically, controller 208 is depicted as controlling the position of the various microlenses 250–258 of microlens array 204 of lens system 200 (e.g., via use of one or more feedback control subsystems). Image capture unit 206 is illustrated as receiving image data from photo-detector array 102 and receiving control signals from controller 208. Image capture unit 206 is shown as transmitting captured image information to focus detection unit 210. Focus detection unit 210 is depicted as transmitting focus data to image construction unit 212. Image construction unit 212 is illustrated as transmitting a composite image to image store/display unit 214.

With reference now to FIG. 3, depicted is a high level logic flowchart of a process. Method step 300 shows the start of the process. Method step 302 depicts capturing a primary image with a microlens array having one or more microlenses at one or more primary positions, the microlens array having at least one microlens deviation that exceeds a first tolerance from a target optical property. Examples of the array having at least one microlens deviation that exceeds a first tolerance from a target optical property include (a) where at least one actual microlens position exceeds a first tolerance from at least one defined microlens position, and (b) where at least one microlens of the microlens array has at least one focal length that exceeds a first tolerance from a defined focal length (e.g., a microlens deviation that would produce fifth portion 108 of image 100 at some place behind an imaging surface of photo-detector array 102 or a microlens deviation that would produce portion 104 at some place in front of the imaging surface of photo-detector array 102 where the distance in front or back of the imaging surface exceeds a defined tolerance distance where an image captured with photo-detector array 102 is deemed acceptable). Specific instances of the foregoing include a microlens of the microlens array having at least one spherical aberration that exceeds a first tolerance from a defined spherical aberration, and a microlens of the microlens array having at least one cylindrical aberration that exceeds a first tolerance from a defined cylindrical aberration. Alternatively, the microlens array may have one or more microlenses having some combination of such defects. In one implementation, method step 302 includes the sub-step of capturing the primary image at an average primary focal surface location of the microlens array (e.g., a defined focal surface of the microlens array where an image would form if the microlens array had no microlenses having aberrations outside a specified tolerance). In another implementation, method step 302 includes the sub-step of capturing the primary image with a photo-detector array at the average primary focal surface location of the microlens array (e.g., positioning the microlens array such that a defined focal surface of the microlens array coincides with an imaging surface of a photo-detector array).

Referring again to FIG. 2, one specific example of method step 302 (FIG. 3) would be controller 208 directing lens system 200 to position one or more microlenses of microlens array 204 at one or more primary positions, and thereafter instructing image capture unit 206 to capture an image from photo-detector array 102.

With reference again to FIG. 3, method step 304 illustrates determining at least one out-of-focus region of the primary image (or determining at least one focused region of the primary image). In one implementation, method step 304 includes the sub-step of calculating a Fourier transform of at least a part of the primary image (e.g., sharp, or in-focus images produce abrupt transitions that often have significant high frequency components).

Referring again to FIG. 2, one specific example of method step 304 (FIG. 3) would be focus detection unit 210 performing a Fourier transform and subsequent analysis on at least a part of an image captured by image capture unit 206 when the one or more microlenses of microlens array 204 were at the one or more primary positions. In this example, focus detection unit 210 could deem portions of the image having significant high frequency components as "in focus" images. As a more specific example, the Fourier transform and analysis may be performed on one or more parts of the image that are associated with one or more microlenses 250–258 of microlens array 204.

With reference again to FIG. 3, method step 305 illustrates mapping the at least one out-of-focus region to one or more microlenses of the microlens array. In one implementation, method step 305 includes the sub-steps of projecting mathematically from a surface of a photo-detector to the microlens array; and selecting one or more microlenses of the microlens array in response to said projecting.

Referring again to FIG. 2, one specific example of method step 305 (FIG. 3) would be controller 208 performing a mathematical mapping based on (a) known geometries of microlenses 250–258 relative to photo-detector array 102 and (b) focus/out-of-focus information received from focus detection unit 210. In one exemplary implementation, controller 208 is pre-programmed with knowledge of the position/orientation of photo-detector array 102 and can thus calculate the mathematical projection based on controller 208's positioning of microlenses 250–258. In other exemplary implementations, controller 208 additionally controls and/or monitors the positioning of photo-detector array 102 through one or more control and/or monitoring subsystems, and thus has acquired—rather than pre-programmed—knowledge of the position/orientation of photo-detector array 102 upon which to base the calculations.

With reference again to FIG. 3, method step 306 illustrates moving at least a part of the mapped one or more microlenses of the microlens array to one or more other positions.

Referring again to FIG. 2, one specific example of method step 306 (FIG. 3) would be controller 208 causing a control subsystem of lens system 200 to move one or more individual microlenses 250–258 of microlens array 204. In one exemplary implementation, MEMS control systems and techniques are used. In other exemplary implementations, conventional control systems and techniques are used to effect the movement and control of microlenses 250–258 of microlens array 204.

With reference again to FIG. 3, method step 307 shows capturing another image with the one or more microlenses at the other positions to which they have been moved. In one exemplary implementation, method step 306 includes the sub-step of capturing the other image at the average primary focal surface location of the microlens array with its individual microlenses at their primary positions (e.g., one or more microlenses 250–258 of microlens array 204 are moved, but the image is captured on about the same surface as that upon which the primary image was captured, such as shown and described in relation to FIGS. 4 and 5). In another exemplary implementation, the step of capturing the other image at a primary focal surface location of the microlens array with its individual microlenses at their primary positions further includes the sub-steps of moving at least a part of the microlens array (e.g., at least one microlens) to the other position; and capturing the other image with a photo-detector array which remains stationary at the primary focal surface location of the one or more microlenses at their one or more primary positions (e.g., one or more microlenses 250–258 of microlens array 204 are moved to one or more other positions, while photo-detector array 102 remains stationary, such as shown and described in relation to FIGS. 4 and 5). In another exemplary implementation, the step of moving at least a part of the microlens array to the other position further includes the sub-step of moving the at least a part of the microlens array to the other position within at least one distance constrained by a predefined aberration from at least one defined microlens position.

Figure 4:
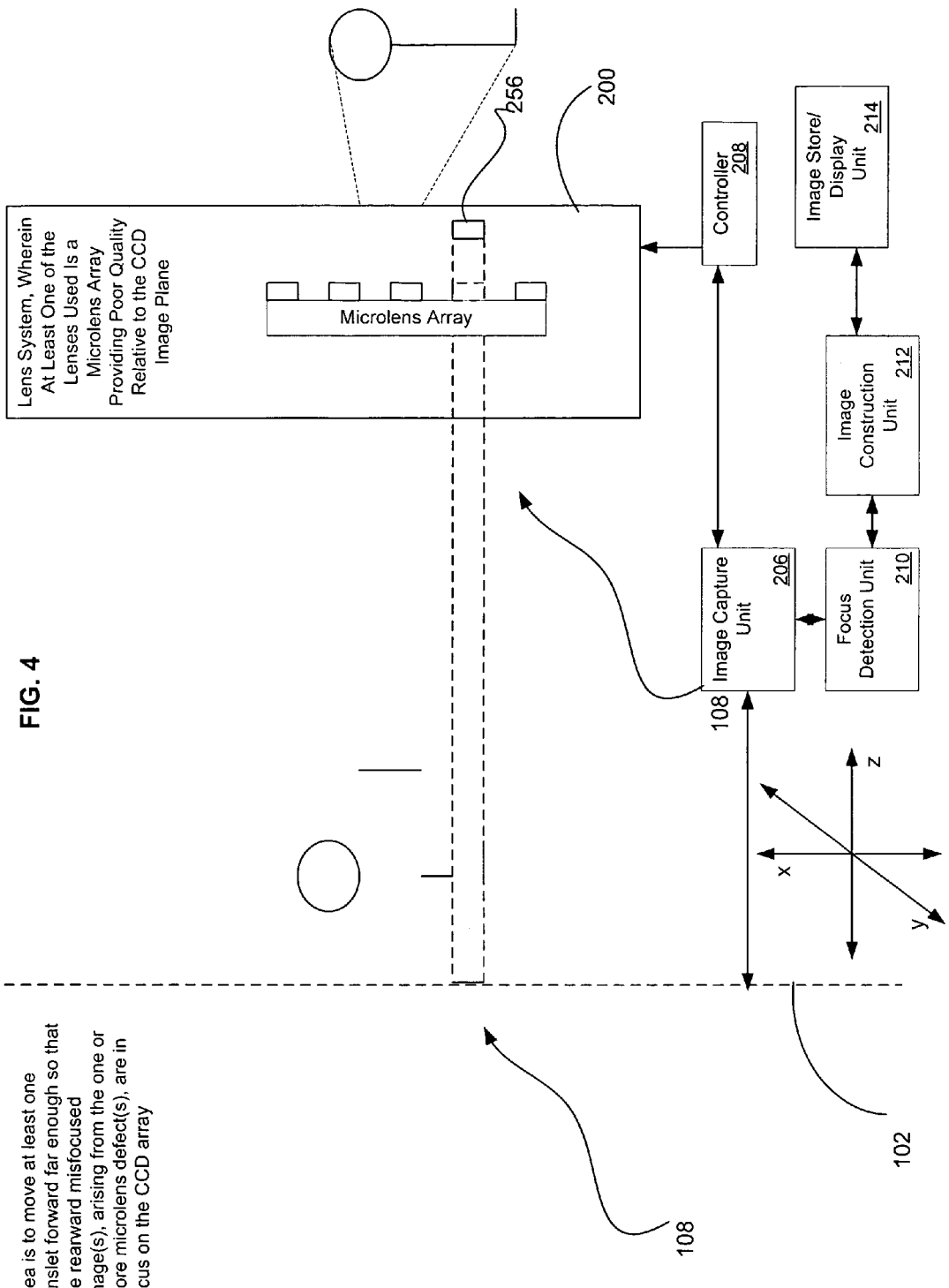
FIG. 4 depicts a side-plan view of the system of FIG. 2 wherein microlens array 204 has been moved in accordance with aspects of the process shown and described in relation to FIG. 3.
Figure 5:
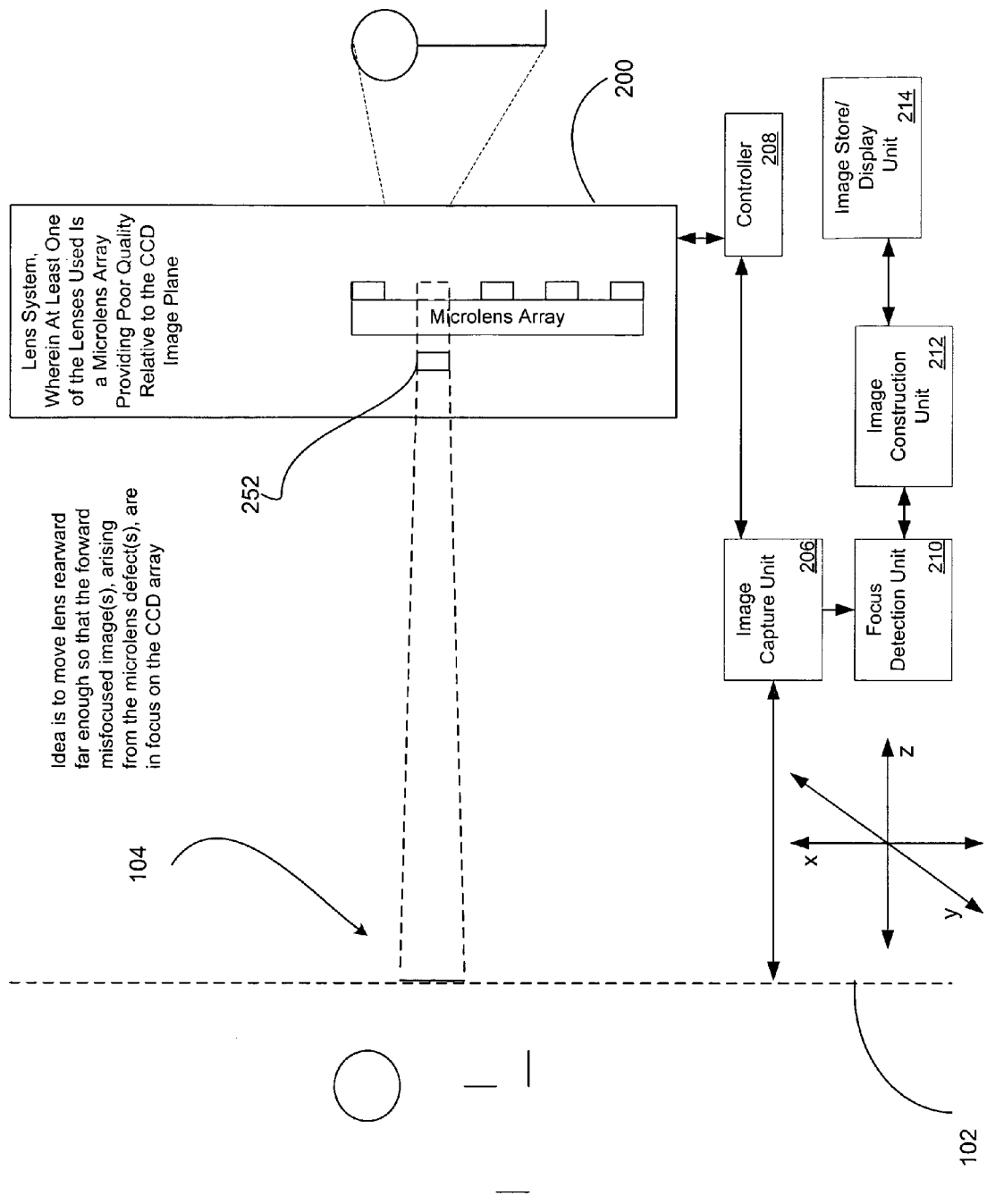
FIG. 5 illustrates another side-plan view of the system of FIG. 2 wherein microlens array 204 has been moved in accordance with aspects of the process shown and described in relation to FIG. 3.

Referring now to FIGS. 2, 4 and/or 5, one specific example of method step 306 (FIG. 3) would be controller 208 directing lens system 200 to position one or more of microlenses 250–258 of microlens array 204 at one or more positions other than their primary positions, and thereafter instructing image capture unit 206 to capture an image from photo-detector array 102. FIG. 4 shows and describes moving at least a portion of microlens array 204 forward of a primary position (e.g., such as by controller 208 causing a MEMS control system to move microlens 256 of microlens array 204 forward relative to an imaging surface of photo-detector array 102, or by causing microlens array 204 to be compressed such that microlens 256 of microlens array 204 moves forward relative to the imaging surface of photo-detector array 102). FIG. 5 shows and describes moving at least a portion of the microlens array rearward of the primary position (e.g., such as by controller 208 causing a MEMS control system to move microlens 252 of microlens array 204 rearward relative to an imaging surface of photo-detector array 102, or by causing microlens array 204 to be compressed such that microlens 252 of microlens array 204 moves rearward relative to an imaging surface of photo-detector array 102).

With reference again to FIG. 3, method step 308 depicts determining a focus of at least one region of the other image relative to a focus of the at least one out-of-focus region of the primary image. In one implementation, method step 308 includes the sub-step of calculating a Fourier transform of at least a part of at least one region of the other image (e.g., sharp or in-focus images produce abrupt transitions that often have significant high frequency components). In one implementation, the step of calculating a Fourier transform of at least a part of at least one region of the other image (e.g., sharp or in-focus images produce abrupt transitions that often have significant high frequency components) includes the sub-step of mapping at least one region of the primary image with at least one region of the other image (e.g., mapping an out-of-focus region of the first image to a corresponding region of the second image). As a more specific example, the Fourier transform and analysis may be performed on one or more parts of the image that are associated with one or more microlenses of the microlens array (e.g., mapping at least one region of the primary image associated with at least one specific microlens against the at least one region of the other image associated with the at least one specific microlens).

Referring again to FIGS. 2, 4 and/or 5, one specific example of method step 308 (FIG. 3) would be focus detection unit 210 performing a Fourier transform and subsequent analysis on at least a part of an image captured by image capture unit 206 when at least one microlens of microlenses 250–258 of microlens array 204 was at the other position specified by controller 208.

With reference again to FIG. 3, method step 310 depicts constructing a composite image in response to the at least one region of the other image having a sharper focus relative to the focus of the at least one out-of-focus region of the primary image. In one implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In yet another implementation, the step of constructing a composite image in response to the at least one region of the other image having a sharper focus relative to the focus of the at least one out-of-focus region of the primary image includes the sub-step of utilizing at least one of tiling image processing techniques, morphing image processing techniques, blending image processing techniques, and stitching image processing techniques.

In yet another implementation, the step of constructing a composite image in response to the at least one region of the other image having a sharper focus relative to the focus of the at least one out-of-focus region of the primary image includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite image using the corrected distortion. In yet another implementation, the step of constructing a composite image in response to the at least one region of the other image having a sharper focus relative to the focus of the at least one out-of-focus region of the primary image includes the sub-step of correcting for motion between the primary and the other image.

Referring again to FIGS. 2, 4 and/or 5, one specific example of method step 302 (FIG. 3) would be image construction unit 212 creating a composite image by replacing those portions of an image of person 202 captured at a primary position with more in-focus portions of an image of person 202 captured by image capture unit 206 when microlens array 204 was at the other position. In one implementation of the example, image construction unit 212 corrects for the motion between images using conventional techniques if such correction is desired. In another implementation of the example, motion correction is not used.

With reference again to FIG. 3, method step 312 shows a determination of whether an aggregate change in focus, relative to the primary position of method step 302, has exceeded a maximum expected aberration of at least one lens of the microlens array. For example, even with a relatively poor quality microlens array, there will typically be an upper manufacturing limit beyond which microlens aberrations are not expected to go (e.g., the microlens array has manufacturing criteria such that each microlens in the array provide a focal length of 5 mm+/−0.05 mm).

Referring again to FIGS. 2, 4 and/or 5, one specific example of method step 312 (FIG. 3) would be controller 208 comparing an aggregate movement in a defined direction against a pre-stored upper limit deviation value. In an implementation of the example illustrated in FIG. 4, if microlens array 204 has manufacturing criteria such as a focal length of 5 mm+/−0.05 mm, controller 208 will determine whether the total forward movement of microlens 256 of microlens array 204 is greater than 0.05 mm relative to microlens 256's primary position. In an implementation of the example illustrated in FIG. 5, if microlens array 204 has manufacturing criteria such as a focal length of 5 mm+/−0.05 mm, controller 208 will determine whether the total rearward movement of microlens 252 of microlens array 204 is greater than 0.05 mm relative to microlens 252's primary position.

With reference again to FIG. 3, if the inquiry of method step 312 yields a determination that the aggregate changes in focuses has met or exceeded the maximum expected aberration of at least one lens of the microlens array, the process proceeds to method step 314. Method step 314 illustrates that the current composite image (e.g., of method step 310) is stored and/or displayed. One specific example of method step 314 would be image store/display unit 214 either storing or displaying the composite image.

Method step 316 shows the end of the process.

Returning to method step 312, shown is that in the event that the upper limit on microlens array tolerance of at least one lens of the microlens array has not been met or exceeded, the process proceeds to method step 306 and continues as described herein.

Referring now to FIG. 4, depicted is a side-plan view of the system of FIG. 2 wherein microlens 256 has been moved in accordance with aspects of the process shown and described in relation to FIG. 3. Microlens 256 of lens system 200 is illustrated as having been moved to another position forward of its primary position which gave rise to microlens 256's respective portion of image 100 shown and described in relation to FIGS. 1 and 2. Specifically, microlens 256 of microlens array 204 is illustrated as repositioned such that fifth portion 108 of image 100 is right sized and focused on an imaging surface of photo-detector array 102 (e.g., as shown and described in relation to method step 306). In one implementation, fifth portion 108 of image 100 can be combined with previously captured in focus and right sized portions 106 (e.g., FIGS. 1 and 2) to create a composite image such that the defects associated with fifth portion 108 as shown and described in relation to FIGS. 1 and 2 are alleviated (e.g., as shown and described in relation to method step 310). The remaining components and control aspects of the various parts of FIG. 4 function as described elsewhere herein.

With reference now to FIG. 5, illustrated is another side-plan view of the system of FIG. 2 wherein microlens 252 has been moved in accordance with aspects of the process shown and described in relation to FIG. 3. Microlens 252 of lens system 200 is illustrated as having been moved to another position rearward of its primary position which gave rise microlens 252's respective portion of image 100 shown and described in relation to FIG. 1. Specifically, microlens 252 of microlens array 204 is illustrated as positioned such that first portion 104 of image 100 is right sized and focused on an imaging surface of photo-detector array 102 (e.g., as described in relation to method step 306). In one implementation, first portion 104 of image 100 can be combined with previously captured in focus and right sized portions 106 of FIGS. 1 and 2, 108 of FIG. 4) to create a composite image such that the defects associated with first portion 104 as shown and described in relation to FIGS. 1 and 2 are alleviated (e.g., as shown and described in relation to method step 310). The remaining components and control aspects of the various parts of FIG. 5 function as described elsewhere herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A method comprising:
   capturing a primary image with a microlens array at a primary position, the microlens array having at least one microlens deviation that exceeds a first tolerance from a target optical property;
   determining at least one out-of-focus region of the primary image;
   capturing another image with at least one microlens of the microlens array at another position;
   determining a focus of at least one region of the other image relative to a focus of the at least one out-of-focus region of the primary image; and
   constructing a composite image in response to the at least one region of the other image having a sharper focus relative to the focus of the at least one out-of-focus region of the primary image.

2. The method of claim 1, wherein said capturing a primary image with a microlens array at a primary position, the microlens array having at least one microlens deviation that exceeds a first tolerance from a target optical property further comprises:

capturing with the microlens array having at least one microlens position that exceeds a first tolerance from at least one defined primary position.

3. The method of claim 1, wherein said capturing a primary image with a microlens array at a primary position, the microlens array having at least one microlens deviation that exceeds a first tolerance from a target optical property further comprises:
capturing with a microlens array frame having at least one frame deviation that exceeds a first tolerance from at least one defined array frame position.

4. The method of claim 1, wherein said capturing a primary image with a microlens array at a primary position, the microlens array having at least one microlens deviation that exceeds a first tolerance from a target optical property further comprises:
capturing with at least one microlens having a focal length that exceeds a first tolerance from a defined focal length.

5. The method of claim 1, wherein said capturing a primary image with a microlens array at a primary position, the microlens array having at least one microlens deviation that exceeds a first tolerance from a target optical property further comprises:
capturing with at least one microlens having a spherical aberration that exceeds a first tolerance from a defined spherical aberration.

6. The method of claim 1, wherein said capturing a primary image with a microlens array at a primary position, the microlens array having at least one microlens deviation that exceeds a first tolerance from a target optical property further comprises:
capturing with at least one microlens having a cylindrical aberration that exceeds a first tolerance from a defined cylindrical aberration.

7. The method of claim 1, wherein said capturing a primary image with a microlens array at a primary position, the microlens array having at least one microlens deviation that exceeds a first tolerance from a target optical property further comprises:
capturing the primary image at a primary focal surface location of the microlens array.

8. The method of claim 7, wherein said capturing the primary image at a primary focal surface location of the microlens array further comprises:
capturing the primary image with a photo-detector array at the primary focal surface location of the microlens array.

9. The method of claim 1, wherein said capturing another image with at least one microlens of the microlens array at another position further comprises:
mapping the at least one out-of-focus region to one or more microlenses of the microlens array;
moving at least a part of the mapped one or more microlenses of the microlens array to the other position; and
capturing the other image with a photo-detector array.

10. The method of claim 9, wherein said mapping the at least one out-of-focus region to one or more microlenses of the microlens array further comprises:
projecting mathematically from a surface of the photo-detector array to the microlens array; and
selecting the one or more microlenses of the microlens array in response to said projecting.

11. The method of claim 1, wherein said capturing another image with at least one microlens of the microlens array at another position further comprises:

moving at least a part of the microlens array to the other position.

12. The method of claim 11, wherein said moving at least a part of the microlens array to the other position further comprises:
moving at least one microlens of the microlens array to the other position; and
capturing the other image with a photo-detector array at an average primary focal surface location of the microlens array at the primary position.

13. The method of claim 12, wherein said moving at least one microlens of the microlens array to the other position further comprises:
moving the at least one microlens of the microlens array to the other position, said moving constrained by a predefined aberration from at least one defined microlens position.

14. The method of claim 1, wherein said determining at least one out-of-focus region of the primary image further comprises:
calculating a Fourier transform of at least a part of the primary image.

15. The method of claim 14, wherein said calculating a Fourier transform of at least a part of the primary image further comprises:
calculating a Fourier transform of at least one region of the primary image associated with at least one microlens.

16. The method of claim 1, wherein said determining a focus of at least one region of the other image relative to a focus of the at least one out-of-focus region of the primary image further comprises:
calculating a Fourier transform of the at least one region of the other image.

17. The method of claim 16, wherein said calculating a Fourier transform of the at least one region of the other image further comprises:
mapping at least one region of the primary image with the at least one region of the other image.

18. The method of claim 1, wherein said constructing a composite image in response to the at least one region of the other image having a sharper focus relative to the focus of the at least one out-of-focus region of the primary image further comprises:
replacing at least a part of the out-of-focus region of the primary image with at least a part of the at least one region of the other image.

19. The method of claim 18, wherein said replacing at least a part of the out-of-focus region of the primary image with at least a part of the at least one region of the other image further comprises:
utilizing at least one of tiling image processing techniques, morphing image processing techniques, blending image processing techniques, and stitching image processing techniques.

20. The method of claim 1, wherein said constructing a composite image in response to the at least one region of the other image having a sharper focus relative to the focus of the at least one out-of-focus region of the primary image further comprises:
correlating a feature of the primary image with a feature of the other image;
detecting at least one of size, color, and displacement distortion of at least one of the primary image and the other image;

correcting the detected at least one of size, color, and displacement distortion of the at least one of the primary image and the other image; and assembling the composite image using the corrected distortion.

21. The method of claim 1, further comprising:

correcting for motion between the primary and the other image.

22. A system comprising:

a microlens array having at least one microlens deviation that exceeds a first tolerance from a target optical property;

means for capturing a primary image with a lens at a primary position;

means for determining at least one out-of-focus region of the primary image;

means for capturing another image with the lens at another position;

means for determining a focus of at least one region of the other image relative to a focus of the at least one out-of-focus region of the primary image; and means for constructing a composite image in response to the at least one region of the other image having a sharper focus relative to the focus of the at least one out-of-focus region of the primary image.

23. The system of claim 22, wherein said microlens array having at least one microlens deviation that exceeds a first tolerance from a target optical property further comprises:

the microlens array having at least one microlens position that exceeds a first tolerance from at least one defined microlens position.

24. The system of claim 22, wherein said microlens array having at least one microlens deviation that exceeds a first tolerance from a target optical property further comprises:

a microlens array frame having at least one frame deviation that exceeds a first tolerance from at least one defined array frame position.

25. The system of claim 22, wherein said microlens array having at least one microlens deviation that exceeds a first tolerance from a target optical property further comprises:

at least one microlens having a focal length that exceeds a first tolerance from a defined focal length.

26. The system of claim 22, wherein said microlens array having at least one microlens deviation that exceeds a first tolerance from a target optical property further comprises:

at least one microlens having a spherical aberration that exceeds a first tolerance from a defined spherical aberration.

27. The system of claim 22, wherein said microlens array having at least one microlens deviation that exceeds a first tolerance from a target optical property further comprises:

at least one microlens having a cylindrical aberration that exceeds a first tolerance from a defined cylindrical aberration.

28. The system of claim 22, wherein said means for capturing a primary image with a lens at a primary position further comprises:

means for capturing the primary image at a primary focal surface location of the microlens array.

29. The system of claim 28, wherein said means for capturing the primary image at a primary focal surface location of the microlens array further comprises:

means for capturing the primary image with a photo-detector array at the primary focal surface location of the microlens array.

30. The system of claim 22, wherein said means for capturing another image with the lens at another position further comprises:

means for mapping the at least one out-of-focus region to one or more microlenses of the microlens array;

moving at least a part of the mapped one or more microlenses of the microlens array to the other position; and capturing the other image with a photo-detector array.

31. The system of claim 30, wherein said means for mapping the at least one out-of-focus region to one or more microlenses of the microlens array further comprises:

means for projecting mathematically from a surface of the photo-detector array to the microlens array; and means for selecting the one or more microlenses of the microlens array in response to said projecting.

32. The system of claim 22, wherein said means for mapping the at least one out-of-focus region to one or more microlenses of the microlens array further comprises:

means for moving at least a part of the microlens array to the other position.

33. The system of claim 32, wherein said means for moving at least a part of the microlens array to the other position further comprises:

means for moving at least one microlens of the microlens array to the other position; and means for capturing the other image with a photo-detector array at an average primary focal surface location of the microlens array at the average primary position.

34. The system of claim 32, wherein said means for moving at least one microlens of the microlens array to the other position further comprises:

means for moving the at least one microlens of the microlens array to the other position, said moving constrained by a defined deviation from at least one defined microlens position.

35. The system of claim 22, wherein said means for determining at least one out-of-focus region of the primary image further comprises:

means for calculating a Fourier transform of at least a part of the primary image.

36. The system of claim 35, wherein said means for calculating a Fourier transform of at least a part of the primary image further comprises:

means for calculating a Fourier transform of at least one region of the primary image associated with at least one microlens.

37. The system of claim 22, wherein said means for determining a focus of at least one region of the other image relative to a focus of the at least one out-of-focus region of the primary image further comprises:

means for calculating a Fourier transform of at least a part of the at least one region of the other image.

38. The system of claim 37, wherein said means for calculating a Fourier transform of at least a part of the at least one region of the other image further comprises:

means for mapping at least one region of the primary image with at least one region of the other image.

39. The system of claim 37, wherein said calculating a Fourier transform of the at least one region of the other image further comprises:

means for mapping at least one region of the primary image associated with at least one specific microlens against the at least one region of the other image associated with the at least one specific microlens.

40. The system of claim 22, wherein said means for constructing a composite image in response to the at least one region of the other image having a sharper focus relative to the focus of the at least one out-of-focus region of the primary image further comprises:

means for replacing at least a part of the out-of-focus region of the primary image with at least a part of the at least one region of the other image.

41. The system of claim 40, wherein said means for replacing at least a part of the out-of-focus region of the primary image with at least a part of the at least one region of the other image further comprises:

means for utilizing at least one of tiling image processing techniques, morphing image processing techniques, blending image processing techniques, and stitching image processing techniques.

42. The system of claim 22, wherein said means for constructing a composite image in response to the at least one region of the other image having a sharper focus relative to the focus of the at least one out-of-focus region of the primary image further comprises:

means for correlating a feature of the primary image with a feature of the other image;

means for detecting at least one of size, color, and displacement distortion of at least one of the primary image and the other image;

means for correcting the detected at least one of size, color, and displacement distortion of the at least one of the primary image and the other image; and means for assembling the composite image using the corrected distortion.

43. The system of claim 22, wherein said means for constructing a composite image in response to the at least one region of the other image having a sharper focus relative to the focus of the at least one out-of-focus region of the primary image further comprises:

means for correcting for motion between the primary and the other image.

* * * * *

UNITED STATES PATENT AND TRADEMARK OFFICE
CERTIFICATE OF CORRECTION

PATENT NO. : 6,967,780 B2   Page 1 of 1
DATED : November 22, 2005
INVENTOR(S) : Hillis et al.

It is certified that error appears in the above-identified patent and that said Letters Patent is hereby corrected as shown below:

<u>Column 1,</u>
Lines 28 and 29, cancel" substantially contemporaneously herewith by express mail."
and insert -- 21 January 2004, USAN 10/764,340. --.

Signed and Sealed this

Fourth Day of April, 2006

JON W. DUDAS
*Director of the United States Patent and Trademark Office*